US007691164B2

(12) United States Patent
Kellermann

(10) Patent No.: US 7,691,164 B2
(45) Date of Patent: Apr. 6, 2010

(54) SUCTION DEVICE

(75) Inventor: Christian Kellermann, Stapelfeld (DE)

(73) Assignee: DOLMAR GmbH, Hamburg (DE)

(*) Notice: Subject to any disclaimer, the term of this patent is extended or adjusted under 35 U.S.C. 154(b) by 555 days.

(21) Appl. No.: 11/668,190

(22) Filed: Jan. 29, 2007

(65) Prior Publication Data

US 2008/0104936 A1 May 8, 2008

(30) Foreign Application Priority Data

Feb. 13, 2006 (DE) .................. 20 2006 002 330 U

(51) Int. Cl.
*B01D 51/00* (2006.01)

(52) U.S. Cl. ........................ 55/467; 55/385.1; 55/459.1

(58) Field of Classification Search .................. 55/467, 55/385.1, 459.1

See application file for complete search history.

(56) References Cited

U.S. PATENT DOCUMENTS

| | | | | |
|---|---|---|---|---|
| 3,183,899 | A * | 5/1965 | Tuggle | 123/41.65 |
| 3,994,067 | A * | 11/1976 | Hazzard et al. | 30/383 |
| 4,841,920 | A * | 6/1989 | Andreasson et al. | 123/41.66 |
| 5,174,255 | A * | 12/1992 | Collins et al. | 123/179.1 |
| 5,544,630 | A * | 8/1996 | Koga | 123/185.3 |
| 6,227,162 | B1 | 5/2001 | Dahlberg et al. | |
| 6,470,848 | B2 * | 10/2002 | Takahashi et al. | 123/198 E |
| 6,733,086 | B1 * | 5/2004 | McSharry et al. | 299/64 |
| 6,991,664 | B2 * | 1/2006 | Riehmann et al. | 55/321 |
| 7,007,660 | B2 * | 3/2006 | Taomo et al. | 123/198 E |
| 7,182,800 | B2 * | 2/2007 | Uhl et al. | 55/346 |
| 7,497,886 | B2 * | 3/2009 | Walker | 55/385.1 |
| 2001/0045199 | A1 * | 11/2001 | Nagai et al. | 123/196 R |
| 2002/0117145 | A1 * | 8/2002 | Honda | 123/196 R |
| 2002/0121260 | A1 * | 9/2002 | Sato et al. | 123/196 R |
| 2002/0121262 | A1 * | 9/2002 | Kawamoto et al. | 123/196 W |
| 2002/0189560 | A1 * | 12/2002 | Linsbauer et al. | 123/41.65 |
| 2002/0189573 | A1 * | 12/2002 | Janoske | 123/198 E |
| 2003/0019460 | A1 * | 1/2003 | Tezuka et al. | 123/192.2 |
| 2003/0051697 | A1 * | 3/2003 | Liu | 123/196 R |
| 2003/0079704 | A1 * | 5/2003 | Ito et al. | 123/90.16 |
| 2003/0172898 | A1 * | 9/2003 | Uhl | 123/198 B |

(Continued)

FOREIGN PATENT DOCUMENTS

DE 37 08 289 A1 9/1987

(Continued)

*Primary Examiner*—Jason M Greene
*Assistant Examiner*—Dung Bui
(74) *Attorney, Agent, or Firm*—Kelly Lowry & Kelley LLP

(57) ABSTRACT

A suction device for a cyclone filter of a hand-guided work apparatus includes a blower which is located in a housing and a starting unit with a cable drum which is rotatably mounted about an axis, wherein ambient air sucked in with dirt particles is divided by the cyclone filter into a first air stream which is largely freed from dirt particles and into a second air stream loaded with dirt particles. The housing has an inlet and an outlet for the second air stream, which has a simple configuration and a good suction performance for air laden with dirt particles. The blower is mounted rotatably about an axis which is arranged coaxially to the cable drum axis and the housing is designed with a channel which is connected to the inlet and opens in the region of the cable drum axis.

24 Claims, 3 Drawing Sheets

U.S. PATENT DOCUMENTS

Figure 1:
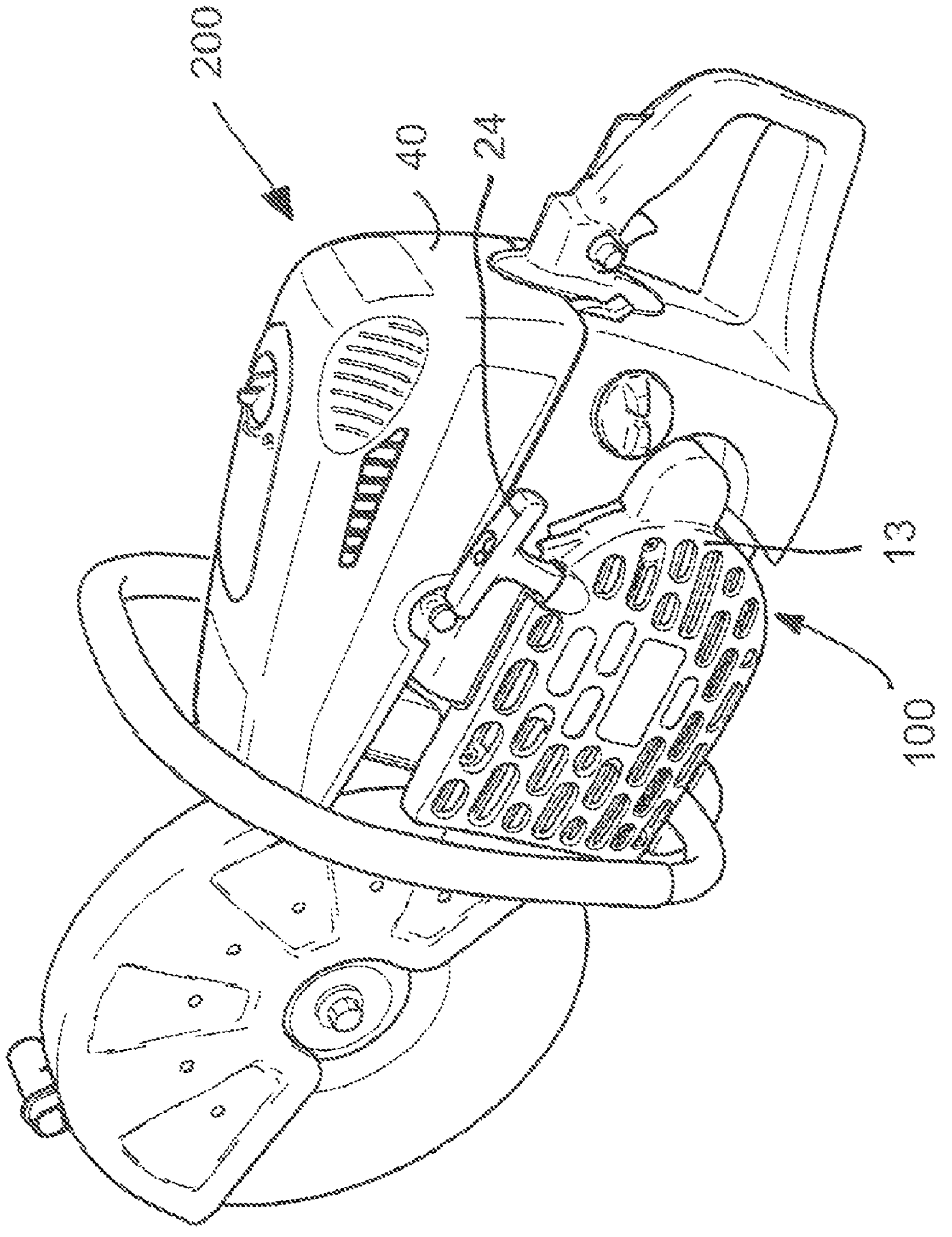

| | | | | |
|---|---|---|---|---|
| 2003/0221640 | A1 * | 12/2003 | Ohsawa | 123/41.56 |
| 2004/0094114 | A1 * | 5/2004 | Riehmann et al. | 123/198 E |
| 2004/0206312 | A1 * | 10/2004 | Liu et al. | 123/41.6 |
| 2005/0279318 | A1 * | 12/2005 | Nagel et al. | 123/196 R |
| 2006/0150591 | A1 * | 7/2006 | Borinato | 55/385.1 |
| 2006/0185628 | A1 * | 8/2006 | Akaike et al. | 123/41.65 |
| 2007/0125341 | A1 * | 6/2007 | Tamamoto et al. | 123/406.23 |

FOREIGN PATENT DOCUMENTS

| | | |
|---|---|---|
| DE | 101 28 787 A1 | 12/2002 |
| DE | 101 28 790 A1 | 12/2002 |

* cited by examiner

SUCTION DEVICE

The invention relates to a suction device for a cyclone filter of a hand-guided work apparatus, in particular a chain saw, an angle grinder or the like, comprising a blower which is located in a housing and a starting unit with a cable drum which is rotatably mounted about an axis, wherein ambient air containing dirt particles which is sucked in, is divided by the cyclone filter into a first air stream which is largely freed from dirt particles and into a second air stream loaded with dirt particles, wherein the housing has an inlet and an outlet for the second air stream.

It is known from the prior art that when using hand-guided work apparatus driven by internal combustion engines, such as angle grinders, chain saws or the like, the combustion air sucked in by the motor entrains dirt particles, fine dust or other solids which results in considerable wear of the engine at the pistons and/or cylinders and to frequent maintenance intervals of the air filters of the carburetors. Felt mats with cellulose fine filters or oil-impregnated foam pre-filters, for example, are used for these air filters. These filters certainly largely prevent dirt particles from entering into the engine but also produce a severely contaminated filter so that the quantity of combustion air is reduced and the power of the engine is thus reduced. The frequent maintenance intervals thus required are time-consuming and costly and in addition, these are no longer carried out at too high frequency so that the aforesaid power reduction will persist or will be further intensified.

In order to keep the combustion air as clean as possible thus obviate the aforesaid problems, numerous dust separators or suction systems have been proposed for the combustion air.

DE-AS 25 50 165 describes a suction device for a lawn mower which comprises a cylindrical housing with tangential air inlet openings, the combustion air being removed in the centre of the housing. The tangentially inflowing combustion air forms a vortex so that the air is cleaned as in a cyclone dust separator in which the solid particles (dirt particles) are carried outwards as a result of the centrifugal force. At the centre, the vortex thus contains relatively few dirt particles so that the combustion air removed there is considerably cleaner than the air which is normally sucked in.

DE 101 28 790 A1 describes a suction device for the combustion air of a combustion engine for a hand-guided work apparatus. In this case, the suction device has a centrifugal separator which separates the flow of combustion air into a central core flow having a low particle density and a jacket flow surrounding the core flow having a higher particle density than in the core flow, wherein the core flow is substantially guided by an air filter into the combustion chamber of the internal combustion engine and the jacket flow loaded with dirt particles is exhausted.

However, it has been shown that in suction devices with a centrifugal separator, it is necessary to have a suction blower to produce a corresponding vacuum which involves an additional expenditure, weight and space requirement. The vacuum required to expel the dirt-laden air from the centrifugal separator, in particular the cyclone filter, is only achieved with relatively large blower diameters.

It is the object of the present invention to provide a suction device which avoids said disadvantages, in particular to create a suction device which is simply configured and has a good suction performance for the air laden with dirt particles.

A suction device having the features of claim 1 is proposed to achieve this object. Preferred further developments are specified in the dependent claims.

For this purpose, it is provided according to the invention that the blower which provides cooling air for the motor of the work apparatus is mounted rotatably about an axis which is arranged coaxially to the cable drum axis. The housing is designed with a channel which is connected to the inlet and opens in the region of the cable drum axis, whereby the second air stream is effectively guided by the cyclone filter through the channel into the outlet. It is particularly advantageous that a blower already present inside the work apparatus can be combined, in particular can be used, for the suction device according to the invention.

When the work apparatus is operating, the combustion air for the internal combustion engine is sucked from the surroundings, the sucked-in air being laden with dirt particles which accumulates as dust, for example, in an angle grinder during the angle grinding process. The centrifugal separator which can be embodied as a cyclone, in particular as an axial cyclone or a turbo filter, preferably produces in the interior a central first air flow (core flow) having a low dirt particle density, that is a zone which is largely low in dirt particles with preferably extremely fine particles, and a second air flow (jacket flow) surrounding the first air flow (core flow). In this case, the second air flow (jacket flow) has a higher dirt particle density with particles of larger and moderate diameter. The centrifugal separator is preferably designed in such a manner that this has an inlet cylinder in which the combustion air sucked in from the surroundings is brought on a substantially circular path by blowing in from the side, wherein the rotational speed in the outer region of the flow thus formed increases to such an extent that the dirt particles are hurled outwards by the centrifugal forces produced. In this case, the first air flow which is largely free from dirt particles leaves the centrifugal separator centrally and is guided in the direction of the combustion chamber.

The dirt-laden second air flow is sucked in by the blower which is arranged in the work apparatus. In this case, the second air flow enters into the inlet and is guided by the channel. In the area of the cable drum axis, in particular the cable drum mounting, the second air flow leaves the channel and is effectively sucked in by the blower which conveys the second air flow through the outlet. It has been shown that as a result of the design configuration of the suction device according to the invention, in particular pressure relationships are established in the region of the cable drum axis which bring about effective extraction of the dirt-laden second air stream from the cyclone filter. Such a vacuum is established as a result of the intelligent air flow guidance in the area of the channel mouth that is sufficient to guide the second air flow satisfactorily from the cyclone filter through the blower into the outlet.

In a particular embodiment of the invention, the channel runs radially to the cable drum axis. The cable drum axis can be embodied as hollow, for example, with the channel opening therein. Appropriately in this case, the cable drum axis is designed as a hollow shaft. During the suction process, the second air flow flows through the channel and is guided into the hollow shaft which then leaves the second air flow and flows axially to the blower axis. The blower then conveys the second air flow through the outlet. According to the invention, such a vacuum is established inside the hollow shaft which ensures effective extraction of the second air flow.

In a further alternative of the invention, it can be appropriate if the channel is connected in one piece to the housing. In this case, it can be advantageous if the housing is constructed as an injection moulding made of plastic.

In order to keep the assembly expenditure low, the housing is advantageously designed as multipart, wherein a first housing part holds the blower and a second housing part holds the starting unit. The blower is mounted rotatably about the blower axis in the first housing part, wherein the blower is preferably a fan propeller which, for example, in one possible configuration, consists of a metallic material.

In a feasible alternative embodiment of the invention, the outlet of the housing opens into the surroundings. That is, the sucked-in dirt or dust has been sucked in by the propeller wheel and passed through the inlet and the outlet via the channel, it is blown back into the open air again. It is furthermore possible to construct the outlet in such a manner that the extracted dirt flows via the cylinder of the work apparatus, whereby cooling of the motor can be achieved.

In an alternative embodiment of the suction device, it can be advantageous if the outlet of the blower housing is guided into the exhaust system of the work apparatus. The air flow laden with dirt particles is guided to the exhaust system, for example, via a channel to effectively cool the exhaust gas flow and/or the silencer arranged in the exhaust system.

Further advantages, features and details of the invention are obtained from the following description in which an exemplary embodiment of the invention is explained in detail with reference to the drawings. In this case, the features mentioned in the claims and in the description can each be important to the invention for themselves or in any combination.

Figure 2:
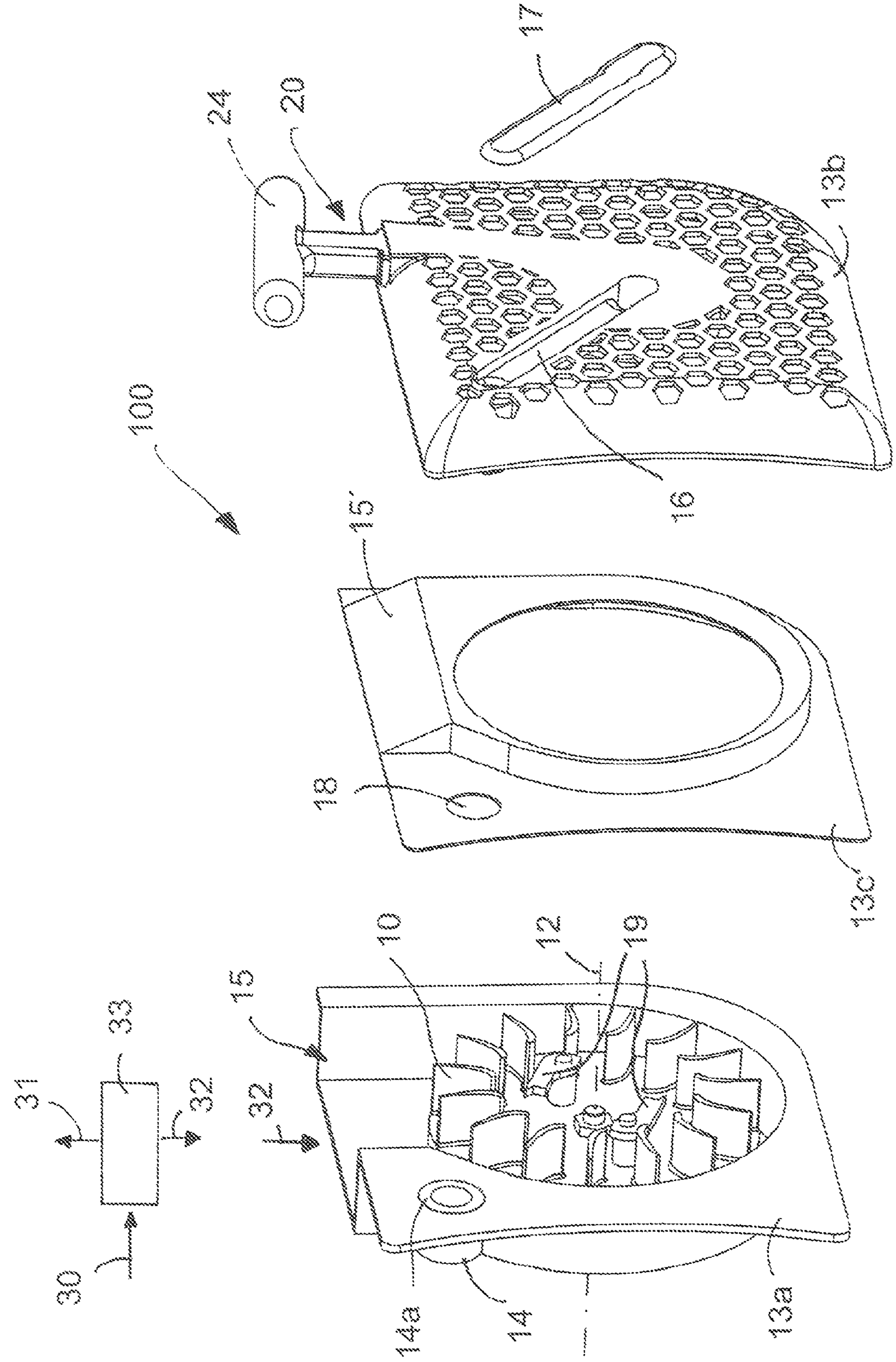
Figure 3:
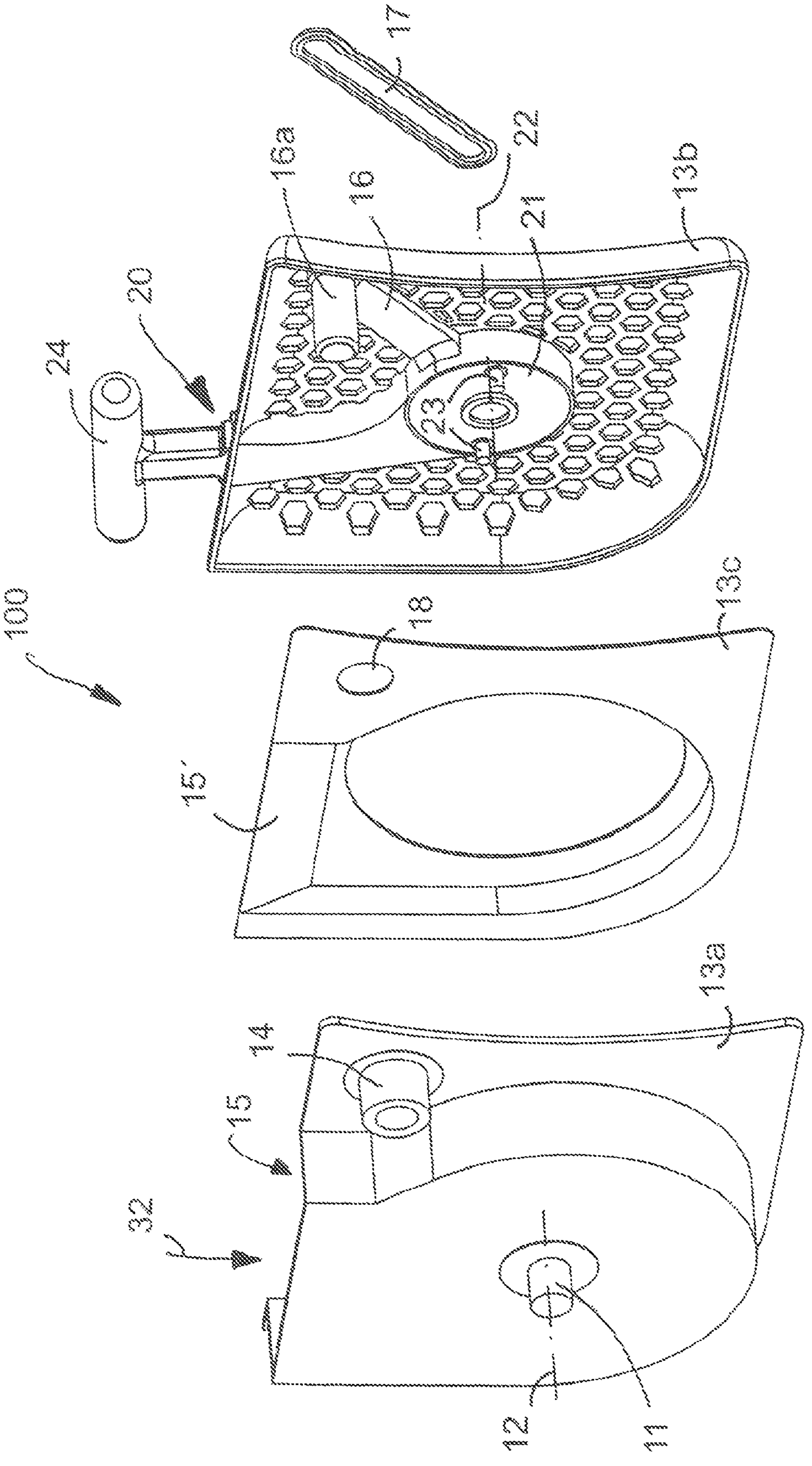

FIG. 1 is a perspective view of a section device according to the invention for a hand-guided work apparatus, FIG. 2 is an exploded view of the suction device in a first view and FIG. 3 is an exploded view of the section device according to FIG. 2 in a second view.

FIG. 1 shows a work apparatus 200 which is an angle grinder 200 in the exemplary embodiment shown. The angle grinder 200 has a motor housing 40 inside which an internal combustion engine is arranged. In addition, a starting unit 20 can be identified, at least in part from FIG. 1, its handle 24 projecting from the housing 13. The work apparatus 200 comprises a suction device 100 which provides the cooling air for the motor. The invention starts at the suction device 100 which is explained explicitly in FIGS. 2 and 3.

According to FIG. 2, the housing comprises a first housing part 13*a* and a second housing part 13*b*. Located in the first housing part 13*a* is the blower 10 in the form of a propeller fan which is mounted rotatably about an axis of rotation 12. The first housing part 13*a* also has an inlet 14 and an outlet 15.

The second housing part 13*b* is formed with a channel 16 which is likewise illustrated in FIG. 3. The starting unit 20 is integrated in the second housing part 13*b*. The cable drum 21 of the starting unit 20 is mounted rotatably about the axis 22, the cable drum axis 22 being positioned coaxially to the blower axis 12. As is indicated in FIG. 3, the channel 16 runs radially to the cable drum axis 22. In the pre-sent exemplary embodiment, the cable drum axis 22 is embodied as a hollow shaft. The channel 16 is furthermore constructed with a connecting channel 16*a* which extends into the inlet 14 in the manner of a projection. In the assembled state of the housing 13, the channel 16 is connected to the inlet 14, the channel 16 opening into the hollow shaft 22.

On the side facing the blower 10, the cable drum 21 has drivers 23 to which counter-drivers 19 are assigned on the blower 10 which is clearly shown in FIGS. 2 and 3. When the starting unit 20 is actuated, in particular by pulling out the handle 24, the cable drum 21 is rotated about the hollow shaft 22, whereby the drivers 23 engage on the counter-drivers 19, thus effecting a rotation of the blower 10 about its axis 12. This angular momentum is passed on via the shaft 11 to the motor of the work apparatus 200 for the starting process.

The section device 100 shown according to FIGS. 1-3 is designed with a cyclone filter which extracts the combustion air from the surroundings. The problem is that dirt such as dust or the like is produced during operation of such work apparatus, in particular in angle grinders by their working tool. In this case, the dirt can be formed or organic or inorganic particles. The combustion air sucked in by the combustion engine of the work apparatus 200 must be cleaned entering into the combustion chamber of the internal combustion engine which is not shown, in order to avoid wear. For this purpose, the work apparatus 200 has a centrifugal separator 33 shown purely schematically in FIG. 2, which sucks in ambient air 30 laded with dirt particles from outside and separates the combustion air into at least one first air flow which is largely free from dirt particles and a second air flow 32 laden with dirt particles. The first air flow 31 is then guided into the combustion chamber of the internal combustion engine. Located between the combustion engine and the centrifugal separator 33 is preferably one air filter which additionally cleans the first air flow 31 which is largely freed from dirt particles and which is not explicitly shown. The air 32 laden with dirt particles is guided into the inlet 14, where the fan propeller 10 can generate the required vacuum with its guide vanes.

During operation of the work apparatus 200, the internal combustion engine drives the propeller fan 10 at an appropriate rotational speed. The propeller fan 10, in particular with the aid of the fan vanes, generates a corresponding vacuum, in particular inside the hollow shaft 22, whereby the departing second air stream 32 from the centrifugal separator 33 is extracted through the inlet 14, which is designed as cylindrical and which extends in the manner of a projection from the first housing part 13*a*. The air flow 32 laden with dirt particles flows through the connecting channel 16*a* which is located inside the cylindrical inlet 14 and then enters into the channel 16 which is closed by a cover element 17 on the side of the second housing part 13*b* facing away from the blower 10. The flowing second air flow 32 leaves the channel 16 and enters into the hollow shaft 22, the second air flow 32 leaving the hollow shaft 22 axially to the blower axis 12. The blower 10 finally conveys the second air flow 32 from the blower 13 through its outlet 15.

As is illustrated in FIGS. 2 and 3, an intermediate element 13*c* is located between the first and the second housing part 13*a*, 13*b*. Said intermediate element 13*c* has an opening 18 as well as a flow baffle 15'. In the assembled state of the housing 13 the connecting channel 16 projects through the opening 18 and is surrounded by the cylindrical inlet 14. Located between the inlet 14 and the connecting channel 16*a* is a rubber plug-in coupling 14*a*.

REFERENCE LIST

100 Suction device
200 Work apparatus, angle grinder
10 Blower, propeller fan
11 Shaft
12 Blower axis
13 Housing
13*a* First housing part
13*b* Second housing part
13*c* Intermediate element
14 Inlet
14*a* Plug-in coupling
15 Outlet

15' Flow baffle
16 Channel
**16*a*** Connecting channel
17 Cover
18 Opening
19 Counter-driver
20 Starting unit
21 Cable drum
22 Cable drum axis
23 Driver
24 Handle element
30 Ambient air
31 First air flow
32 Second air flow
33 Centrifugal separator, cyclone filter
40 Motor housing

The invention claimed is:

1. A suction device for a cyclone filter of a hand-guided work apparatus, in particular a chain saw or angle grinder, comprising a blower which is located in a housing and a starting unit with a cable drum which is rotatably mounted about an axis, wherein ambient air sucked in with dirt particles is divided by the cyclone filter into a first air stream which is largely freed from dirt particles and into a second air stream loaded with dirt particles, wherein the housing has an inlet and an outlet for the second air stream, characterised in that the blower is mounted rotatably about an axis which is arranged coaxially to the cable drum axis and the housing is designed with a channel which is connected to the inlet and opens in the region of the cable drum axis, whereby the second air stream is effectively guided from the cyclone filter through the channel into the outlet, and characterised in that the channel runs radially to the cable drum axis.

2. The suction device according to claim 1, characterised in that the channel is connected on one piece to the housing.

3. The suction device according to claim 1, characterised in that on the side facing away from the blower, the channel is embodied as open and is closed by a cover.

4. The suction device according to claim 1, characterised in that the outlet opens into the surroundings or into the exhaust system of the work apparatus.

5. The suction device according to claim 1, characterised in that the cable drum axis is designed as hollow into which the channel opens.

6. The suction device according to claim 5, characterised in that the cable drum axis is designed as a hollow shaft.

7. The suction device according to claim 1, characterised in that the cable drum is operatively connected to the blower.

8. The suction device according to claim 7, characterised in that on the side facing the blower the cable drum has drivers to which counter-drivers are assigned on the blower.

9. The suction device according to claim 8, characterised in that when the starting unit is actuated, the drivers engage on the counter-drivers, causing a rotation of the blower about its axis.

10. The suction device according to claim 1, characterised in that the housing comprises an injection moulding made of plastic.

11. The suction device according to claim 10, characterised in that the housing is designed as multipart, wherein a first housing part holds the blower and a second housing part holds the starting unit.

12. The suction device according to claim 11, characterised in that the inlet is designed as cylindrical, extending in the manner of a projection from the first housing part.

13. The suction device according to claim 12, characterised in that the second housing part is formed with a connecting channel which extends in the manner of a projection into the inlet.

14. A suction device for a cyclone filter of a hand-guided work apparatus, in particular a chain saw or angle grinder, comprising a blower which is located in a housing and a starting unit with a cable drum which is rotatably mounted about an axis, wherein ambient air sucked in with dirt particles is divided by the cyclone filter into a first air stream which is largely freed from dirt particles and into a second air stream loaded with dirt particles, wherein the housing has an inlet and an outlet for the second air stream, characterised in that the blower is mounted rotatably about an axis which is arranged coaxially to the cable drum axis and the housing is designed with a channel which is connected to the inlet and opens in the region of the cable drum axis, whereby the second air stream is effectively guided from the cyclone filter through the channel into the outlet, and characterized in that the cable drum axis is designed as hollow into which the channel opens.

15. The suction device according to claim 14, characterised in that the cable drum axis is designed as a hollow shaft.

16. The suction device according to claim 14, characterised in that the outlet opens into the surroundings or into the exhaust system of the work apparatus.

17. The suction device according to claim 14, characterised in that the housing comprises an injection moulding made of plastic.

18. The suction device according to claim 17, characterised in that the housing is designed as multipart, wherein a first housing part holds the blower and a second housing part holds the starting unit.

19. The suction device according to claim 14, characterised in that the cable drum is operatively connected to the blower.

20. The suction device according to claim 19, characterised in that on the side facing the blower the cable drum has drivers to which counter-drivers are assigned on the blower.

21. The suction device according to claim 20, characterised in that when the starting unit is actuated, the drivers engage on the counter-drivers, causing a rotation of the blower about its axis.

22. A suction device for a cyclone filter of a hand-guided work apparatus, in particular a chain saw or angle grinder, comprising a blower which is located in a housing and a starting unit with a cable drum which is rotatably mounted about an axis, wherein ambient air sucked in with dirt particles is divided by the cyclone filter into a first air stream which is largely freed from dirt particles and into a second air stream loaded with dirt particles, wherein the housing has an inlet and an outlet for the second air stream, characterised in that the blower is mounted rotatably about an axis which is arranged coaxially to the cable drum axis and the housing is designed with a channel which is connected to the inlet and opens in the region of the cable drum axis, whereby the second air stream is effectively guided from the cyclone filter through the channel into the outlet, and characterized in that the housing comprises an injection moudling made of plastic, and characterized in that the housing is designed as multipart, wherein a first housing part holds the blower and a second housing part holds the starting unit, and characterized in that the inlet is designed as cylindrical, extending in the manner of a projection form the first housing part.

23. The suction device according to claim 22, characterised in that the second housing part is formed with a connecting channel which extends in the manner of a projection into the inlet.

24. A suction device for a cyclone filter of a hand-guided work apparatus, in particular a chain saw or angle grinder, comprising a blower which is located in a housing and a starting unit with a cable drum which is rotatably mounted about an axis, wherein ambient air sucked in with dirt particles is divided by the cyclone filter into a first air stream which is largely freed from dirt particles and into a second air stream loaded with dirt particles, wherein the housing has an inlet and an outlet for the second air stream, characterised in that the blower is mounted rotatably about an axis which is arranged coaxially to the cable drum axis and the housing is designed with a channel which is connected to the inlet and opens in the region of the cable drum axis, whereby the second air stream is effectively guided from the cyclone filter through the channel into the outlet, and characterized in that on the side facing away from the blower, the channel is embodied as open and is closed by a cover.

* * * * *